(12) United States Patent
Gil et al.

(10) Patent No.: US 8,958,081 B2
(45) Date of Patent: Feb. 17, 2015

(54) SPOT COLOR CONTROL METHOD, APPARATUS AND SYSTEM

(75) Inventors: Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1270 days.

(21) Appl. No.: 12/261,624

(22) Filed: Oct. 30, 2008

(65) Prior Publication Data

US 2009/0296112 A1   Dec. 3, 2009

Related U.S. Application Data

(60) Provisional application No. 61/056,343, filed on May 27, 2008.

(51) Int. Cl.
| | |
|---|---|
| *H04N 1/54* | (2006.01) |
| *H04N 1/60* | (2006.01) |
| *H04N 1/405* | (2006.01) |
| *H04N 1/409* | (2006.01) |
| *G06K 15/02* | (2006.01) |
| *G06F 3/12* | (2006.01) |
| *G03F 3/00* | (2006.01) |

(52) U.S. Cl.
CPC .................................... *H04N 1/6022* (2013.01)
USPC ......... 358/1.13; 358/1.16; 358/1.9; 358/3.01; 358/3.21; 358/3.24; 358/3.26; 358/504; 358/515; 358/518; 358/523; 382/162; 382/167

(58) Field of Classification Search
CPC .................................................... H04N 1/6044
USPC ............. 358/1.13, 1.16, 1.9, 3.01, 3.21, 3.24, 358/3.26, 504, 515, 518, 523; 382/162, 167
See application file for complete search history.

(56) References Cited

U.S. PATENT DOCUMENTS

| | | | | |
|---|---|---|---|---|
| 5,812,694 | A | * | 9/1998 | Mahy ............................ 382/162 |
| 5,999,703 | A | * | 12/1999 | Schwartz et al. ............... 358/1.9 |
| 2004/0119992 | A1 | * | 6/2004 | Falk et al. ....................... 358/1.9 |
| 2004/0136013 | A1 | * | 7/2004 | Mestha et al. .................. 358/1.9 |
| 2004/0136015 | A1 | * | 7/2004 | Van de Capelle et al. ..... 358/1.9 |
| 2005/0041832 | A1 | * | 2/2005 | Queiroz et al. ................ 382/100 |
| 2005/0071104 | A1 | * | 3/2005 | Viturro et al. ................... 702/85 |
| 2005/0179727 | A1 | * | 8/2005 | Bestmann ........................ 347/43 |
| 2005/0213124 | A1 | * | 9/2005 | Takeshita et al. .............. 358/1.9 |
| 2005/0248786 | A1 | * | 11/2005 | Tobie et al. ..................... 358/1.9 |
| 2007/0121133 | A1 | * | 5/2007 | Bourgoin et al. .............. 358/1.9 |
| 2007/0171442 | A1 | * | 7/2007 | Granger ......................... 358/1.9 |

* cited by examiner

*Primary Examiner* — Beniyam Menberu
(74) *Attorney, Agent, or Firm* — Fay Sharpe LLP (57) ABSTRACT

This disclosure provides spot color control methods, apparatus and systems. According to one exemplary embodiment, disclosed is a method of generating device dependent color recipes for a plurality of printing devices. The method includes generating a first device dependent recipe for a target color for rendering on a first printing device, and generating a second device dependent recipe for the target color for rendering on a second printing device, whereby the second device dependent recipe is a function of the first device dependent color recipe.

14 Claims, 4 Drawing Sheets

SPOT COLOR CONTROL METHOD, APPARATUS AND SYSTEM

This application claims the priority benefit of U.S. provisional application Ser. No. 61/056,343, filed May 27, 2008, the disclosure of which is totally incorporated herein by reference.

BACKGROUND

This disclosure relates generally to methods, apparatus and systems for color management of image/text printing or display systems. More specifically, this disclosure relates to providing consistent spot colors using multiple printing devices or image displays.

To satisfy customer expectations, the printing industry requires the capability of producing spot colors accurately and consistently. Spot colors can be defined as a fixed set of colors which may be Pantone® colors, custom logo colors or other customer defined colors in the form of an index table. Spot colors are often used, or can be used, for large background areas, which may be the most color critical portion of a particular page. Consistent color in these areas may determine the difference between success or failure in meeting customer's requirements.

In image production systems that produce images on a recording medium, such as printers, photocopiers, facsimile machines, and other xerographic devices, it is desired to control, as closely as possible, the actual perceived color of the output images. One known method to optimize image color output is to provide a look-up-table (LUT) that translates received color signals into optimized color signals for printing, for example, on a printer.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Adding black (K) as a fourth color in this manner usually saves cost, as black (K) ink is usually cheaper than colored ink, and allows more colors to be produced than were achievable with the original three primary colors. Controlling the amount of black addition is considered useful for high quality printing. Having black gives better stability to prints in the presence of print variables such as relative humidity, temperature, material latitude etc. Increased gamut for dark colors is also achieved with the addition of black toner. One major disadvantage in adding black is the excessive black in flesh tones, sky tones and other important tone scales can make these tone scales appear dirty/grainy or non-uniform with black toner. However, some key colors (e.g., flesh tones and sky tones) are sensitive to the addition of black and may not be perceived as optimal if too much black is added. The replacement of the inherent gray component of colors in a three-color space with a fourth, black (K) component is called gray component replacement (GCR) or under color removal (UCR). UCR is usually used when colors are near the neutral axis, such as, for example, the L* axis in L*a*b* space or the C=M=Y axis in CMY color space. GCR is similar to UCR but can be used with colors throughout the color gamut, not just near or at neutral axes. The use of GCR and UCR is known to facilitate the production of pleasing color outputs, optimal gamut, and to improve constraints on area coverage.

Traditionally, determination of the black (K) component in a target color system is done in an ad hoc way by experienced practitioners. This method has the disadvantages of requiring experienced personnel, being generally irreproducible, being costly, and being time-consuming.

Another method used to transform colors in a three-dimensional color space, such as CMY color space, to a four-color color space, such as CMYK color space, is to determine the black (K) component by a one dimensional function that relates the black (K) component as a one-dimensional function of the other components. In the CMY color space, for example, the function K=min(C, M, Y) can be used. This method has the disadvantages of not producing sufficiently optimized colors for the entire color gamut, especially for specialized, or key, colors such as, for example, skin tones.

In another method, a flexible method for estimating the black (K) component comprises (1) determining a maximum black (K) component, (2) adjusting the black (K) component amounts based on chroma, and (3) determining the other color components. In examples of this method, disclosed in U.S. Pat. No. 5,502,579 to Kita et al, (Kita '579) and U.S. Pat. No. 5,636,290 to Kita et al (Kita '290), input image signals are transformed by a four-input-three output controller to L*a*b* color space. A chroma determining means determines chroma signal C* from a* and b*. A UCR ratio calculation means calculates a UCR ratio from the chroma signal C*. The L*a*b* and UCR ratio are then converted into the CMYK output. This method also has the disadvantages of not producing sufficiently optimized colors for the entire color gamut.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of L*. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K. would be constrained to be less than a threshold. A second constraint is to constrain K to be a subset of the range between the minimum and maximum allowed K values.

Another method is discussed in R. Balasubramanian, R. Eschbach, "Design of UCR and GCR strategies to reduce moire in color printing", IS&TPICS Conference, pp. 390-393 (1999) and R. Balasubramanian, R. Eschbach, "Reducing Multi-Separation Color Moire by a Variable Undercolor Removal and Gray Component Replacement Strategy", Journal of Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

Documents that are representations in either electronic or print format inclusive of color graphics or other illustrative forms are generally created electronically in the "creative" stage of the production workflow with sections from various input devices such as, for example, scanners, cameras, computer graphics, etc. In this workflow, the documents are designed using various layout tools and their color appearance is fine tuned by typically proofing on a workgroup digital printer or the press itself. When the prints are made, it is expected that the appearance on the destination printer follows the proof. If it does not follow the proof, then adjustments are made to many places including the color management profile LUTs. One of the key adjustments is the selection of GCR (Gray Component Replacement) methods. As discussed above, the GCR method fine tunes the use of CMYK separations for improving the appearance. Particularly some of the key colors (e.g., black in flesh tones and sky tones) need less black. Sometimes, maximum gamut GCR is preferred over medium GCR to utilize the gamut fully. These adjustments are stored as standard profiles (e.g., ICC profiles).

As discussed above, different UCR/GCR strategies can be used for rendering an image/text on a printing device.

One problem associated with UCR/GCR control relates to rendering spot colors using multiple marking devices. For example, a customer desires a substantially equivalent appearance of a spot color, whether the spot color is rendered on a first, second and/or third image marking device utilized by the customer. If a spot color is rendered on a first printing device utilizing a first GCR strategy and the spot color is rendered on a second printing device utilizing a second, different GCR strategy, the spot colors may not be rendered with an acceptable level of consistency.

This disclosure provides methods, apparatus and systems to provide spot color rendering consistently across multiple printing devices and/or other image output devices that utilize multiple UCR/GCR strategies.

INCORPORATION BY REFERENCE

The following patents and patent applications are incorporated totally herein by reference:

U.S. Patent Application Publication No. 2008/0043263, published Feb. 21, 2008, entitled "SYSTEM AND METHOD FOR AUTOMATED SPOT COLOR EDITOR," by Hancock et al.

U.S. Patent Application Publication No. 2008/0043264, published Feb. 21, 2008, entitled "SPOT COLOR CONTROLS AND METHOD," by Gil et al.

U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT," by Mestha et al.

U.S. Patent Publication No. 2008/0043271 A, published Feb. 21, 2008, entitled "SPOT COLOR CONTROL SYSTEM AND METHOD," by Gil et al.

U.S. Pat. No. 7,110,143, issued Sep. 19, 2006, entitled "ACCURATE PRINTING OF PROPRIETARY MARK PATTERNS AND COLORS," by Bares et al.

U.S. Pat. No. 6,178,007, issued Jan. 23, 2001, entitled "METHOD FOR CONTINUOUS INCREMENTAL COLOR CALIBRATION FOR COLOR DOCUMENT OUTPUT TERMINALS," by Steven J. Harrington.

U.S. Pat. No. 6,157,469, issued Dec. 5, 2000, entitled "DYNAMIC DEVICE INDEPENDENT IMAGE CORRECTION METHOD AND APPARATUS," by Lingappa K. Mestha.

U.S. Pat. No. 6,744,531, issued Jun. 1, 2004, entitled "COLOR ADJUSTMENT APPARATUS AND METHOD," by Mestha et al.

U.S. Pat. No. 6,344,902, issued Feb. 5, 2002, entitled APPARATUS AND METHOD FOR USING FEEDBACK AND FEEDFORWARD IN THE GENERATION OF PRESENTATION IMAGES IN A DISTRIBUTED DIGITAL IMAGE IN A DISTRIBUTED DIGITAL IMAGE PROCESSING SYSTEM," by Duke et al.

U.S. Patent Publication No. 2005/0030560, published Feb. 10, 2005, entitled "METHODS AND SYSTEMS FOR CONTROLLING OUT-OF-GAMUT MEMORY AND INDEX COLORS," by Maltz et al.

U.S. Patent Publication No. 2004/0141193, published Jul. 22, 2004, entitled "STATE-SPACE BASED MODELING OF PIXEL ELEMENTS OF A DYNAMICALLY VARYING COLOR MARKING DEVICE," by Lalit K. Mestha.

U.S. Pat. No. 7,069,164, issued Jun. 27, 2006, entitled "METHOD FOR CALIBRATING A MARKING SYSTEM TO MAINTAIN COLOR OUTPUT CONSISTENCY ACROSS MULTIPLE PRINTERS," to Viturro et al.

U.S. Pat. No. 6,222,648, issued Apr. 24, 2001, entitled "ON LINE COMPENSATION FOR SLOW DRIFT OF COLOR FIDELITY IN DOCUMENT OUTPUT TERMINALS (DOT)," by Wolf et al.

U.S. Pat. No. 6,934,053, issued Aug. 23, 2005, entitled "METHODS FOR PRODUCING DEVICE AND ILLUMINATION INDEPENDENT COLOR REPRODUCTION," by Mestha et al.

U.S. Pat. No. 5,452,094, issued Sep. 19, 1995, entitled: METHOD AND APPARATUS FOR STORAGE AND PRINTING OF LOGOS USING A STORAGE MEDIUM CAPABLE OF STORING MULTIPLE LOGOS," by Ebner et al.

U.S. patent application Ser. No. 11/959,824, filed Dec. 9, 2007, entitled "A METHOD FOR CLASSIFYING A PRINTER GAMUT INTO SUBGAMUTS FOR IMPROVED SPOT COLOR ACCURACY," by Mestha et al.

U.S. Pat. No. 5,502,579, issued Mar. 26, 1996, entitled "COLOR IMAGE PROCESSING METHOD AND APPARATUS CAPABLE OF ADJUSTING THE UCR RATIO," by Kita et al.

U.S. Pat. No. 5,636,290, issued Jun. 3, 1997, entitled "COLOR IMAGE PROCESSING," to Kita et al.

R. BALASUBRAMANIAN et al., "Design of UCR and GCR Strategies to Reduce Moire in Color Printing," IS&TPICS Conference, pp. 390-393 (1999).

R. BALASUBRAMANIAN et al., "Reducing Multi-Separation Color Moire by a Variable Undercolor Removal and Gray Component Replacement Strategy", Journal of Imaging Science & Technology, vol. 45, no. 2, pp. 152-160, March/April, 2001.

R. BALA, "Device Characterization," Chapter 5, Digital Color Imaging Handbook, Gaurav Sharma Ed., CRC Press, 2003.

BRIEF DESCRIPTION

In one exemplary embodiment of this disclosure, a method of generating device dependent color recipes for a plurality of printing devices is disclosed. The method comprises A) generating a first device dependent recipe for a device independent target color for rendering on a first printing device; and B) generating a second device dependent recipe for the device independent target color for rendering on a second printing device, whereby the second device dependent recipe is iteratively calculated using the first device dependent recipe as an initial estimate.

In another exemplary embodiment of this disclosure, a printing apparatus controller is described. The printing apparatus controller comprises a computer-usable data carrier storing instructions that, when executed by the controller, cause the controller to perform a method of generating device dependent color recipes for a plurality of printing devices comprising A) generating a first device dependent recipe for a device independent target color for rendering on a first printing device; and B) generating a second device dependent recipe for the device independent target color for rendering on a second printing device, whereby the second device dependent recipe is iteratively calculated using the first device dependent recipe as an initial estimate.

In still another exemplary embodiment of this disclosure, a print system is disclosed comprising a controller; and a plurality of printing devices operatively connected to the controller, wherein the controller is configured to A) generate a first device dependent recipe for a device independent target color for rendering on a first printing device, and B) generate a second device dependent recipe for the device independent target color for rendering on a second printing device, whereby the second device dependent recipe is iteratively calculated using the first device dependent recipe as an initial estimate.

In yet another exemplary embodiment of this disclosure, according to any one of the above exemplary embodiments, a method, printing apparatus and/or print system is disclosed wherein step A) includes generating the first device dependent recipe using one of a plurality of GCR strategies; and step B) includes iteratively calculating the second device dependent recipe using the first device dependent recipe as an initial estimate using the GCR strategy of step A).

DETAILED DESCRIPTION

Automated Spot Color Editor (ASCE) algorithms, as disclosed in U.S. patent publication No. 2008/0043263, are designed to perform spot color emulation in a way that provides both consistency and accuracy among multiple machines. The CMYK recipes for each spot color are derived by an ASCE method using only the target L*a*b* values, which are then associated to CMYK recipes based on the selection of the GCR or gamut classes. When this approach is used, the target L*a*b* values are shared by multiple machines which may result in different recipes for the same spot color due to the fact that gamut classes overlap in certain regions of the color space as well as the fact that gamut classes can be located in different spaces because of drift present in marking engines (e.g., CYK overlapping with MYK or CYK overlapping with CMY). Although this approach results in relatively consistent and accurate colors, the appearance of spot colors might result in visual differences because of the differences in half tone structures present in the separations, which is created by the interaction among colors when different gamut classes are used for the same spot color.

In this disclosure, provided are algorithms that maintain both accuracy and consistency of spot colors, and improve spot color consistency between printing engines by using the same gamut class for each spot color recipe associated with the printing engines. This approach can be especially useful for multi-color print engines, for example, but not limited to, a four, five and six color print engine.

Notably, the following description describes printing systems including a plurality of four color printing engines. Specifically, these printing engines include CMYK, however, as will be known to those of ordinary skill in the art, the algorithms described are equally applicable to printing systems including printing engines of two, three, five, six (e.g. CMYKOV), seven and/or eight colors. In general, the algorithms can be applied to any printing system including a plurality of multicolor printing engines.

Moreover, the following description describes a CMYK printing system, whereby color recipes are generated to correlate a target spot color represented in the L*a*b* color space to a device dependent CMYK color space. Notably, other color spaces can be used and are within the scope of this disclosure.

Substantively, the exemplary embodiments of this disclosure share CMYK recipes along with their target L*a*b* values of each spot color among multiple machines in order to produce the same color appearance by mitigating the interactions created by multi-separation half tone screens of the spot color recipe. Previous methods only shared the target L*a*b* values of each spot color for all marking engines in order to print both consistent and accurate spot colors. Recent experiments on multiple marking engine systems suggest that the spot colors in the overlapping regions can show differences in appearance even after the spot colors are controlled to less than 1 deltaE2000. Hence, disclosed is a methodology to achieve the same color appearance for spot colors among multiple marking engines besides the normal goal of preserving both accuracy and deltaE consistency of spot colors.

ASCE is an automation of a manual editor feature implemented for multicolor color engines that allow operators to update the CMYK values in the Digital Front End (DFE) spot color dictionary to account for print engine variations. ASCE attempts to match any user defined spot colors including standard Pantone colors, to target L*a*b* values to achieve accurate matching using algorithms and paper based measurements from an inline/offline spectrophotometers or alternatively, a printer model. It also allows customers to automatically maintain color accuracy for spot colors on hardcopy proofs and maintain machine to machine color differences. For further details, see U.S. patent publication No. 2008/0043263, by Hancock et al., published Feb. 21, 2008.

ASCE only requires the target L*a*b* values of any spot color as an initial step to determine the gamut class that will be used to reproduce the given spot color. A three color separation GCR is preferred for controlling spot colors. Once the gamut class has been assigned to a particular spot color, then the algorithm proceeds to modify only the recipes of that particular gamut class in case there exists any color inaccuracy at a given time. The limitation of this approach is that two or more machines can use different gamut classes to reproduce the requested spot color. For example, for CMYK print engines, printer engine #1 might use CYK gamut class to produce a spot color for the target value L*a*b*, and for the same spot color with the same target value, the second printer may use MYK gamut class when the second printer has no knowledge of what separations were used in the first printer. This can result in objectionable differences in appearance for some spot colors due to the half tone interactions among all CMYK values. Hence some customers may object to this even if both accuracy and consistency goals are achieved in multiple machines.

There are at least two events that can cause several printers to select different gamut classes for the same spot color. The first event is when customers want to print spot colors from an existing electronic file. The ASCE workflow will start printing the electronic file with the CMYK embedded in it. The L*a*b* values of each spot color contained in this document will be measured and these values will become targets for all the machines that will be used to print these spot colors. The CMYK recipes derived by each machine can be different since the only information shared among machines are the L*a*b* values. For instance, if the CMYK values contained in the electronic file are all different from zero, then the CMYK values for all machines obtained using ASCE will be strictly different since the gamut classes always keep at least one color equal to 0. This might result in color appearance differences. The second event that can result in different CMYK recipes among machines is when customers are dealing with hard copy proof. In this case, customers will measure the L*a*b* values of spot colors and these values will be the targets for all machines. If printer models for each machine are kept up to date, then ASCE can assign different gamut classes for the same spot color due to the color drift among print engines.

In this disclosure, spot color control methods, apparatus and systems are provided for color consistency and accuracy for spot colors while avoiding the color appearance differences due to inappropriate GCR/gamut class mentioned above.

A cooperative approach is used where printers share both L*a*b* and CMYK values to achieve accurate and consistent appearances of spot colors for multiple printing engines. This is accomplished by determining a leader printer and operation of several follower printers. The following procedure outlines the operation of the spot color control methods, apparatus and systems:

Get L*a*b* and CMYK Values on Leader Printer:

If CMYK values of spot colors are known a priori, i.e. customers want to perform electronic copies of pre-existing files, then use these recipes to print all the spot colors on this printer and measure their L*a*b* values. If the CMYK values are not known, i.e. customers want to perform hard copy proof of printed spot colors, then use ASCE printer model (or printer input-output data) to derive the CMYK values to be used on this printer. Measure all the L*a*b* values of each spot color. Both CMYK and L*a*b* values are shared with all the printers that will be reproducing the same spot colors.

Modify CMYK Values Locally in Follower Printers to Match Received L*a*b* Values from Leader Printer:

Each follower printer will run ASCE locally starting to iterate on CMYK values received from the leader printer if there is any mismatch between the measured and target L*a*b* values. Each follower printer will use the same gamut class obtained from the leader machine.

What follows is a detailed description of printing methods, apparatus and systems utilizing a spot color editor, i.e. ASCE. The disclosed embodiments include multiple printing devices which are referred to as printing engines, IMES and printers. To fully describe the operations of the exemplary embodiments, a description of a spot color editor, as applied to a single printing device, is provided below.

An ASCE provides a method for adjusting or developing multiple color separation combinations to achieve consistency and accuracy in the print productions of spot colors, for example CMYK combinations. The spot color editor provides an automated process under closed-loop control, based on Pantone-defined or customer-defined target values. The editor determines the appropriate target values for the desired customer colors and then activates the Automated Spot Color Editor (ASCE), which utilizes various functionality to achieve consistent customer selectable colors. The ASCE prints a patch(es) using the desired target values, measures the color of the printed patch using a color sensor such as an in-line spectrophotometer, calculates the CMYK combination based on the measurement, and inserts the resultant CMYK combination into a Spot Color Editing table. Alternatively, a printer model can be used to generate a color space representation of the printed patch eliminating the need to print the patch using the desired target values. Additionally, the operator may be provided with the ability to accept the resultant CMYK combination or make adjustments manually. Optionally, a preflight review of the submitted job may be performed to automatically determine whether spot colors are present in the submitted print job.

Various computing environments may incorporate capabilities for supporting a network on which the automated spot color editor may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, mini-computers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 1:
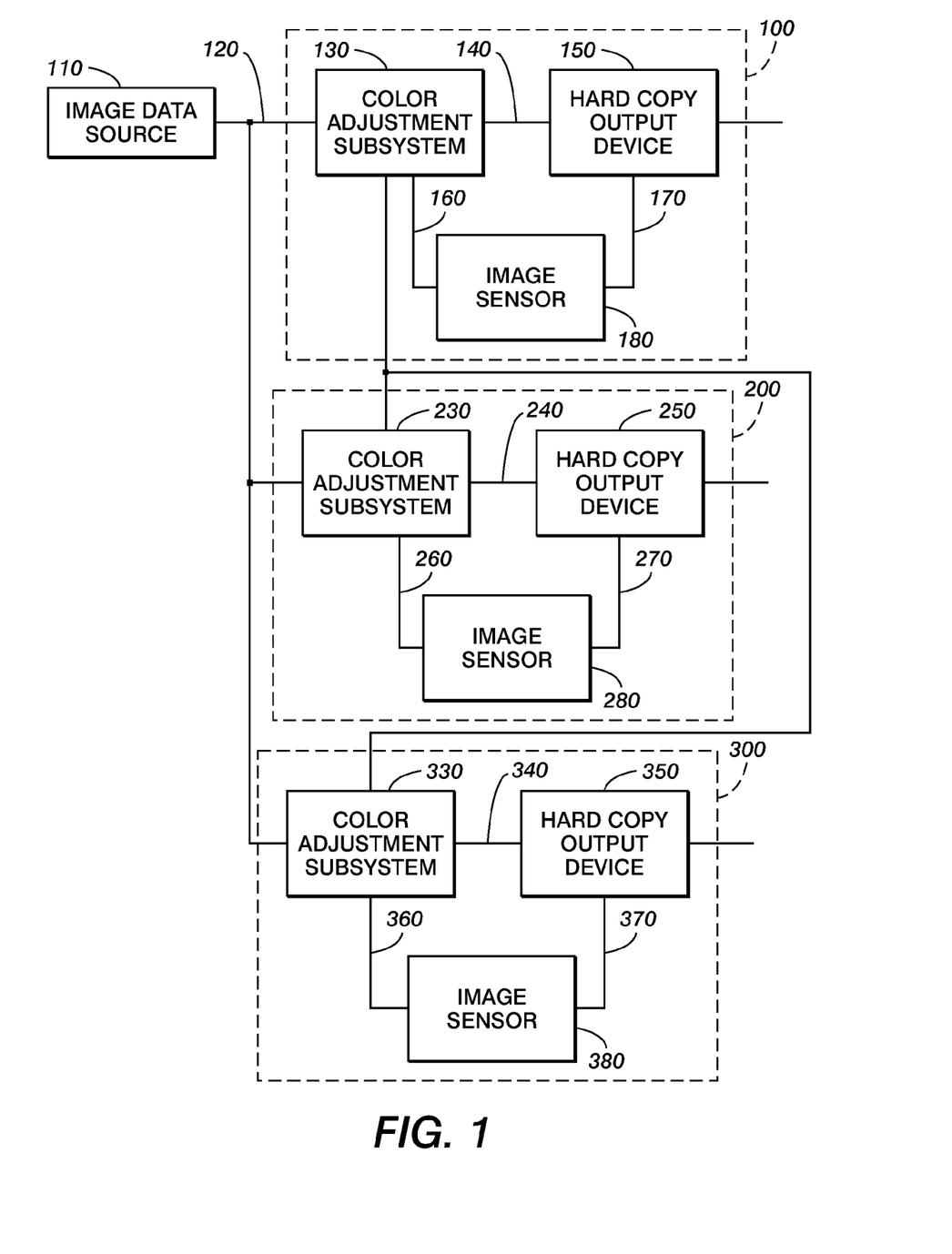
FIG. 1 is a functional block diagram of one exemplary embodiment of a printing apparatus/system in accordance with a spot color editor.

Referring to FIG. 1, there is depicted a functional block diagram of one example embodiment of a three printing engine system with print color adjustment system in accordance with an automated spot color editor. It is to be understood that certain aspects of the system will operate in accordance with pre-programmed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation. As shown in FIG. 1, print color adjustment systems 100, 200 and 300 are connected to an image data source 110 and include color adjustment subsystem 130, 230 and 330, a hard copy output devices 150, 250 and 350 and image sensors 180, 280 and 380. These devices are coupled together via data communication links 120, 140, 160, 170, 240, 260, 270, 340, 360 and 370. These links may be any type of link that permits the transmission of data, such as direct serial connections, a local area network (LAN), wide area network (WAN), an intranet, the Internet, circuit wirings, and the like.

The content for a printing job is initially provided by the customer through an image data source 110 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 110 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output devices 150, 250 and 350 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output devices 150, 250 and 350 generate the hard copy of the image based on printable image data generated by the color adjustment subsystem.

Image sensors 180, 280 and 380 may be any type of device that is capable of detecting image data from a hard copy image and supplying the image data as detected device-independent image data or post-processed image data, which may be in device-independent or in device-dependent form to the color adjustment subsystems 130, 230 and 330. For example, the image sensor may be an optical sensor, a spectrophotometer, a color sensor, or any other known or later developed device or system that is able to measure the color values of the image data from the hard copy image output by the hard copy output device 150.

Although for the purposes of description color adjustment systems 100, 200 and 300 are shown as separate devices from the image data source 110, the color adjustment systems may be an integrated device, such as a digital copier, a computer with a built-in printer, or any other integrated device that is capable of producing a hard copy image output. With such a configuration, for example, the image data source 110, the color adjustment subsystems 130, 230 and 330, the hard copy output devices 150, 250 and 350, and the sensors 180, 280 and 380 may be contained within a single device.

Alternatively, the color adjustment systems 100, 200 and 300 may be a separate device each containing the color adjustment subsystems and the sensor attachable upstream of a stand-alone hard copy output device. For example, the color adjustment subsystem 130 and the sensor 180 may be a device which interfaces with both the image data source 110 and one or more hard copy output devices 150, as would be the case if the color adjustment system 100 is incorporated into a network print server that manages printer data for a plurality of the same or different printing devices.

Furthermore, the color adjustment systems may be implemented as software on the color adjustment subsystems or the image data source 110. The image sensors may be incorporated into the printers or may exist as a standalone device that communicates the detected data back to the image data source 110. Other configurations of the elements shown in FIG. 1 may be utilized without departing from the spirit and scope of the specification and claims herein.

The term "image", as used in this disclosure refers to a graphic or plurality of graphics, compilation of text, a contone or halftone pictorial image, or any combination or subcombination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images." Thus an image may be a document image assembled by a customer at the image data source 110, one or more elements of a document image, a "test patch" generated by printing application software or another type of control system, or a member of a collection of images in a database. Image data source 110 provides image data that, when used to display the image or convert the image into a hard copy, provides an approximate representation of the image. The image data source 110 provides the image data to the color adjustment systems 100, 200 and 300.

For purposes of illustration only, the operation of only color adjustment system 100 is provided below. However, it is to be understood color adjustment systems 200 and 300 operate as described with reference to color adjustment system 100.

The image data input to the color adjustment subsystem 130 may be in either a device-dependent color space or a device-independent color space. For example, if the image data source 110 is a personal computer, the image data used for representing the image is typically in the RGB color space, since this is the color space used by a display of the image data source 110. These RGB values may be directly forwarded to the color adjustment subsystem 130 or may undergo conversion into a device-independent color space, such as L*a*b*, (the Commission Internationale de L'eclairage color standard) prior to being input to the color adjustment subsystem 130. L* defines lightness, a* corresponds to the red/green value, and b* denotes the amount of yellow/blue, which corresponds to the way the human eye perceives color. A neutral color is a color for which a*=b*=0.

If the conversion of the device-dependent color space values into device-independent color space values is not performed by the image data source 110 when inputting the image data to the color adjustment system 100, then the color adjustment system 100 may perform the conversion between the color spaces.

The color adjustment subsystem 130 transforms the device-independent image data into printable image data based on the color space used by the hard copy output device 150. For example, if the hard copy output device 150 is a printer, the color space used by the printer will often be the CMYK color space. In such a case, the color adjustment subsystem 130 converts the device-independent image data into CMYK-color space printable image data for the appropriate target value. Alternatively, the target values may be described in any of the color spaces L*a*b*, CMYK, RGB or sRGB or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 150 may not match the desired colors represented by the device-independent image data.

In the color adjustment system, when a hard copy of the image is output by the hard copy output device 150, the hard copy is placed within the field of detection of the image sensor 180. Image sensor 180 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the color adjustment subsystem 130.

The color adjustment subsystem 130 compares the detected image data values with target image data stored in memory. Based on the comparison, adjustment factors are determined that adjust the printable image data to create a revised color combination for the target value such that the resulting image output by the hard copy output device 150 results in detected image data values that more closely correspond to the target image data. Alternatively, color adjustment subsystem may be utilized to develop new spot colors to meet customer demands and these new spot color combinations are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations has been performed, the color adjustment subsystem 130 provides the hard copy output device 150 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the spot color adjustment comprise steps which are described below. Described is an embodiment in which the methods constitute computer programs made up of computer-executable instructions. The language used to write such programs can be procedural, such as Fortran, or object based, such as C++. One skilled in the art will realize that variations or combinations of these steps can be made without departing from the scope of the disclosure herein.

Initially, the spot color editor determines the appropriate target values for customer colors. The target values can be described in several forms for spot colors. For example, the target values can be in any of the following color spaces: reflectance spectra, L*a*b*, CMYK, RGB, sRGB, parameters describing color, or even the color number. If color numbers are used, the target values are determined via offline experiments. Such experiments would include 1) creating a test pattern with the spot color of interest, 2) printing the pattern on the printer of interest, 3) transporting the pattern for measurements (through the paper path for inline and carrying paper manually for offline measurements), 4) measuring the printed pattern with a color sensor and 5) storing the sensor output to a target log file. For inline measurements, the printer should have an input path for moving the printed pattern in the paper path.

The sensor output may be in any of the device independent color coordinate spaces (reflectance spectra, L*a*b*, XYZ, LHC) or in device dependent spaces (CMY, CMYK, RGB, sRGB) or parameters that succinctly distinguish color (for example, parameters {p1, p2, p3, . . . etc.} used to describe color) depending on the direct output or transformed output of the sensor. Also, the offline/inline experiments may be conducted to determine target values when color matching is required to a hard copy proof. Inline or offline sensors can also be used to obtain the color values of the targets for the hardcopy proofs. The ASCE provides an approach to capture a color value using a spot measurement of the hard copy sample. The approach includes (1) transporting the proof for measurements (through the paper path for inline and carrying proof manually for offline measurements), (2) initiating color sensor measurements to correctly measure the proof, (3) measuring the spot color area of interest in the proof with a color sensor and storing the sensor output to a target log file with a unique spot color identifier. For inline measurements from the proof, the printer should have an input path for moving the printed proof in the paper path while printing process mode is disabled (development, fusing, etc.). In another embodiment, the customer is able to adjust or enter the target values manually. Alternatively, the target colors can be obtained via menu links to the identified designations. The target table may also be a hypertext link to a remote networked site where the target values are adequately defined and labeled. These values may also be obtained using known formulae. The unique spot color identifier is used for the target values so that it matches with the color target names in the document that is to be RIP'ed with the new CMYK combination.

To activate the ASCE function, a software button on a user interface is utilized. When the customer activates the ASCE, control system prints a target patch set using the desired target values or any other modified target values as required by the control algorithm depending on the spot colors. If the customer/operator is not satisfied with the printed spot colors in the test patch, this step would involve repeated iterations of the ASCE. The spot color control algorithms described in U.S. Patent Application Publication No. 2005/0030560 to Maltz et al. ("Methods and Systems for Controlling Out-of-gamut Memory and Index Colors") and U.S. Pat. No. 6,744,531 to Mestha et al. ("Color Adjustment Apparatus and Method"), both hereby incorporated by reference in their entirety, remove the manual color adjustment step and hence can identify the right CMYK combination without distorting other or neighborhood colors in the document. After the iterations are completed, ASCE finds the required CMYK combination for the chosen target values from 130. For determination of the number of iterations to be performed, the algorithm itself may identify the number of iterations required to find the required CMYK combination for the spot colors based on the criteria stored inside the algorithm. One such criteria would be the minimum deltaE, where deltaE is the color difference metric, a value based on the Euclidian distance (the shortest line in 3D) between the coordinates of the reference and sample used to measure the color difference between target values (when target values are stored in terms of L*a*b*) and the measured values for all the spot colors of interest. DeltaE2000 is another perceptual based color difference metric just starting to be used in printing industry.

Figure 2:
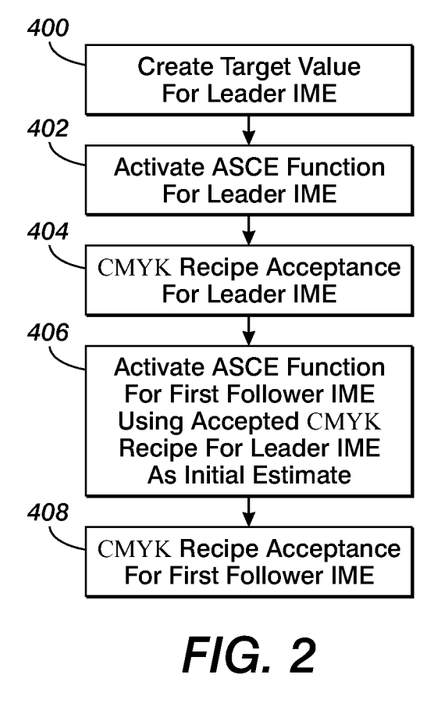
FIG. 2 is a flow chart of an exemplary method of generating device dependent color recipes for a plurality of printing devices in accordance with a spot color editor.

With reference to FIG. 2, illustrated is a flow chart of an exemplary method of generating device dependent color recipes for a plurality of printing devices in accordance with a spot color editor. The plurality of printing devices operate as described with reference to FIG. 1 where color adjustment system 100 is associated with a first IME device and color adjustment system 200 is associated with a second IME.

Initially, one of the plurality of IMEs must be designated a leader IME, then the method creates 400 a target value for the leader IME for printing an associated target spot color.

Next, an ASCE function is activated 402 for the leader IME to generate a respective CMYK color recipe for the target spot color according to the ASCE methods described with reference to FIG. 1.

Next, the CMYK recipe is accepted 404 for the leader IME.

Next, an ASCE function is activated 406 for a first follower IME, i.e. non leader IME, using the accepted CMYK recipe for the leader IME as an initial estimate.

Next, the CMYK recipe is accepted 408 for the first follower IME.

It should be understood the method of FIG. 2 can be executed for any number of follower IMEs where the leader IME CMYK recipe is used for each follower IME's initial color recipe estimate.

Figure 3:
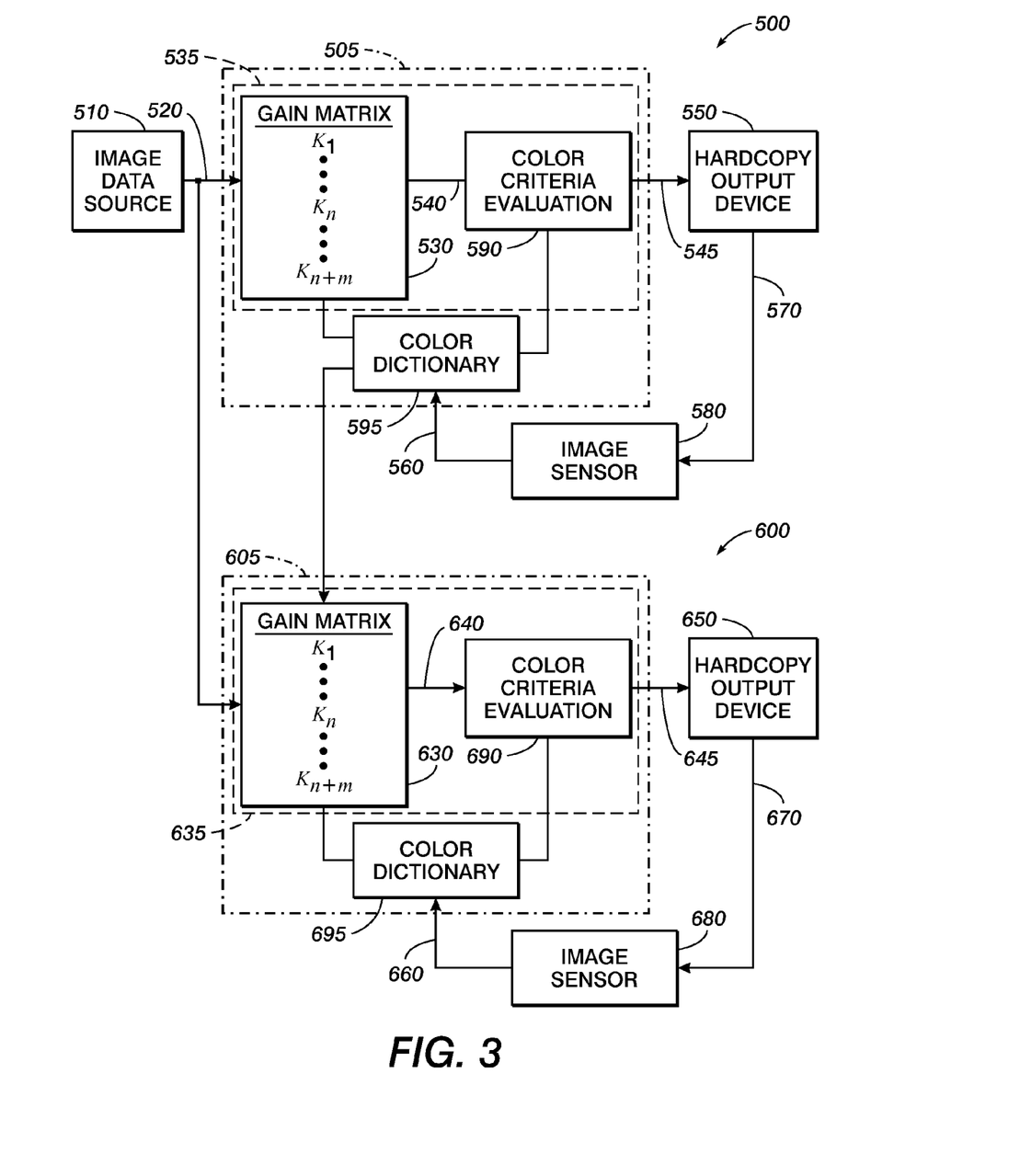
FIG. 3 is a functional block diagram of another exemplary embodiment of a printing apparatus/system in accordance with a spot color editor including a model predictive controller.

Referring to FIG. 3, there is depicted a functional block diagram of another embodiment of a print color adjustment system in accordance with the automated spot color editor disclosed herein. It is to be understood that certain aspects of the system will operate in accordance with pre-programmed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation.

As shown in FIG. 3, the color adjustment systems 500 and 600 are connected to an image data source 510, Automated Spot Color Adjustment Editors (ASCE) 505 and 605, hard copy output device 550, 650, and image sensor 580 and 680. ASCEs 505 and 605 include color dictionaries 595 and 695 and MIMO Model Predictive Controllers (MPC) 535 and 635, having gain matrix modules 530 and 630, and color criteria evaluation modules 590 and 690. These devices are coupled together via data communication links 520, 540, 545, 560, 570, 640, 645, 660 and 670. These links may be any type of link that permits the transmission of data, such as direct serial connections, a local area network (LAN), wide area network (WAN), an intranet, the Internet, circuit wirings, and the like.

The content for a printing job is initially provided by the customer through an image data source 510 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 510 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output devices 550 and 650 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output devices 550 and 650 generate the hard copy of the image based on printable image data generated by the ASCE.

Image sensors 580 and 680 may be any type of device that is capable of detecting image data from a hard copy image and supplying the image data as detected device-independent image data or device dependent image data or post-processed image data, which may be in device-independent or in device-dependent form to ASCEs 505 and 605. For example, the image sensor may be an optical sensor, a spectrophotometer, a color sensor, an inline sensor, an off-line sensor, or any other known or later developed device or system that is able to measure the color values of the image data from the hard copy image output by the hard copy output devices 550 and 650.

Although for the purposes of description ASCEs 505 and 605 are shown as separate devices from the image data source 510, the ASCEs 505 and 605 may be an integrated device, such as a digital copier, a computer with a built-in printer, or any other integrated device that is capable of producing a hard copy image output. With such a configuration, for example, the image data source 510, the ASCEs 505 and 605, the hard copy output devices 550 and 650, and sensors 580 and 680 may be contained within a single device.

Alternatively, ASCEs 505 and 605 may be separate devices containing ASCEs 505 and 605 and sensors 580 and 680 attachable downstream of stand-alone hard copy output devices 550 and 650. For example, the ASCE 505 and the sensor 580 may be a device which interfaces with both the image data source 510 and one or more hard copy output devices 550, as would be the case if the ASCE 505 is incorporated into a network print server that manages printer data for a plurality of the same or different printing devices.

Furthermore, the ASCEs 505 and 605 may be implemented as software on the image data source 510 or the hard copy output devices 550 and 650. The image sensors 580 and 680 may be incorporated into the hard copy output devices 550 and 650 or may exist as standalone devices that communicate the detected data back to the image data source 510. Other configurations of the elements shown in FIG. 3 may be utilized without departing from the spirit and scope of the specification and claims herein.

The image data input to ASCEs 505 and 605 may be in either a device-dependent color space or a device-independent color space. For example, if the image data source 510 is a personal computer, the image data used for representing the image is typically in the RGB color space, since this is the color space used by a display of the image data source 510. These RGB values may be directly forwarded to ASCEs 505 and 605 or may undergo conversion into a device-independent color space, such as L*a*b*, (the Commission Internationale de L'eclairage color standard) prior to being input to the ASCE 505. L* defines lightness, a* corresponds to the red/green value, and b* denotes the amount of yellow/blue, which corresponds to the way the human eye perceives color. A neutral color is a color for which a*=b*=0.

If the conversion of the device-dependent color space values into device-independent color space values is not performed by the image data source 510 when inputting the image data to ASCEs 505 and 605, then the ASCE 505 may perform the conversion between the color spaces.

For purposes of illustration only, the operation of color adjustment system 500 is provided below. However, it is to be understood color adjustment system 600 operates as described with reference to color adjustment system 500. Moreover, it is to be understood FIGS. 3 and 4 and their respective descriptions provide another exemplary embodiment of an ASCE function to determine leader IME color recipes in accordance with this disclosure.

The ASCE 505 transforms the device-independent image data into printable image data based on the color space used by the hard copy output device 550. For example, if the hard copy output device 550 is a printer, the color space used by the printer will often be the CMYK color space. In such a case, the ASCE 505 converts the device-independent image data into CMYK-color space printable image data for the appropriate target value. Alternatively, the target values may be described in any of the color spaces, such as reflectance spectra, L*a*b*, CMYK, RGB, parameters describing color, sRGB, or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 550 may not match the desired colors represented by the device-independent image data.

In the ASCE, when a hard copy of the image is output by the hard copy output device 550, the hard copy is placed within the field of detection of the image sensor 580. Image sensor 580 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the ASCE 505.

Within the ASCE 505, the model predictive controller 535 compares the detected image data values with target image data stored in color dictionary 595. Based on the comparison, adjustment factors are determined that adjust the printable image data to create a revised color recipe for the target value such that the resulting image output by the hard copy output device 550 results in detected image data values that more closely correspond to the target image data. The implementation of the MPC 535 selects, at each iteration of the spot color editor, a gain matrix which is selected from a set of gain matrices 530 within the iteration. The selection is determined by color criteria evaluation module 590, which minimizes a predetermined performance function comparing the deltaE2000 color differences between named spot color L*a*b* values to the measured spot color L*a*b* values for a preset planning or a predictive horizon. The best gain matrix is selected out of the minimization procedure which then becomes the gain matrix actively used during iteration. Operation of the MPC is discussed in more detail with reference to FIG. 4 herein. Alternatively, the ASCE may be utilized to develop new spot colors to meet customer demands and these new spot color recipes are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations have been performed, the ASCE 505 provides the hard copy output device 550 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the ASCE comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 4:
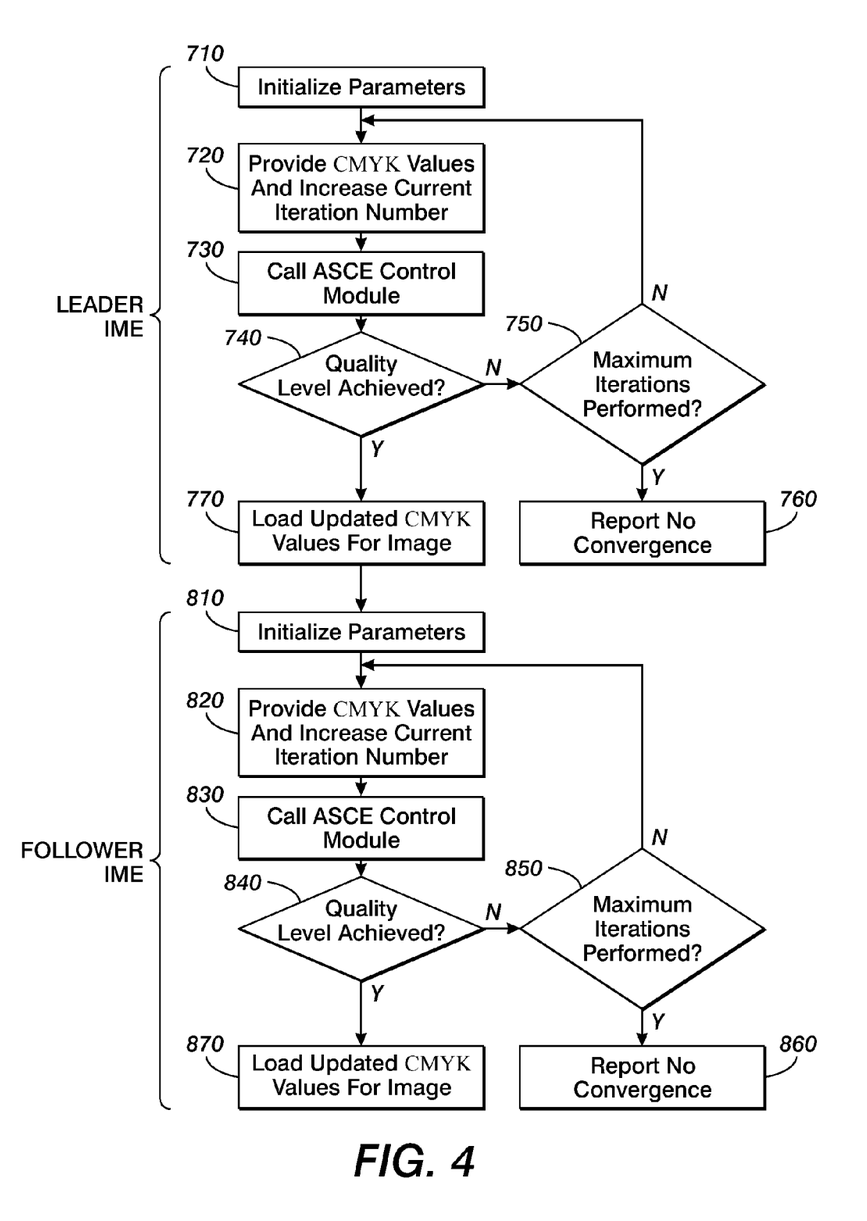
FIG. 4 is a flow chart of another exemplary method of generating device dependent color recipes for a plurality of printing devices in accordance with a spot color editor.

Turning now to FIG. 4, a flowchart illustrates an exemplary embodiment of the method of operation of the automated spot color editor (ASCE). The system begins operation of the ASCE application at 710, with initialization of parameters for the leader IME. The initialized parameters include the current iteration of the ASCE (inum), the desired deltaE2000 (.delta.Etol), and the maximum number of iterations (Iter), of the algorithm. The ASCE module checks the list of spot colors present in the submitted image file against the current printer spot color dictionary. If there are any spot colors on the list that are not included in the printer spot color dictionary, new entries are created in the printer spot color dictionary. This is described more fully in co-pending application U.S. Patent Publication No. 2008/0043263, published Feb. 21, 2008, entitled "SYSTEM AND METHOD FOR AUTOMATED SPOT COLOR EDITOR," by Hancock et al., fully incorporated by reference hereinabove.

The alternate color space (e.g., reflectance spectra, L*a*b*, RGB, sRGB, parameters describing color or even the color number) of each spot color is used to generate each initial CMYK value. If the alternate color space of a spot color is RGB or L*a*b* color space, ASCE will compute the initial CMYK value for the spot color. If the alternate color space is untagged CMYK, then this CMYK value is used. For the purposes herein, tagging is a method by which CMYK values are organized with some marks so that they can be browsed or processed differently for RIP'ing. Tagging assists in locating the right CMYK for a particular color. The initial CMYK (iCMYK), the iteration number (inum), and the current updated CMYK values (uCMYK), are provided to the ASCE application from the printer graphical user interface at 720.

The ASCE control algorithm is called at 730 and performs a first iteration to generate a printable document of patches using the list of spot colors to be updated. To activate the ASCE function at 730, a software button on the user interface is utilized. The CMYK values for each spot color are obtained at 720 from the printer spot color dictionary and the current iteration number is increased. The spot color patch document is RIP'ed by the printer using no color management for CMYK objects and the default halftone and is printed on the print engine. The spot color document is then read through use of an inline sensor or a spectral sensor and the resulting L*a*b* data is sent to the ASCE module. A determination is made as to whether this is the first iteration of the ASCE module. If this is the first iteration, the ASCE checks for L*a*b* reference values for each spot color on the list. If a reference value exists, it is loaded into the ASCE module. It is then determined if there is a reference L*a*b* for each spot color. If so, the ASCE module checks the measured L*a*b* against the reference L*a*b* for each spot color on the list. If a reference L*a*b* does not exist, the measured L*a*b* is written into the ASCE spot color list as the new reference L*a*b* and a signal is sent to "release" the image file to be RIP'ed and printed at 770. If this is not the first iteration of ASCE, for each spot color the measured L*a*b* is checked against the reference L*a*b*.

The color criterion for the current quality level is checked at 740. If the color criteria (for example dE2000) is met for the quality level selected, then the color is ready to be printed at 770. Otherwise, the module continues iterating if the current iteration is less than the maximum number of iterations (Iter) specified at 750. If the quality level for the desired color is not met with the number of iterations being greater than Iter, then the algorithm fails to generate the desired color. The ASCE module is exited and at 760 a message is presented to the operator on the graphical user interface listing the spot colors that failed the quality level specified by the operator and that the printer spot color dictionary has been updated with the closest match possible for each color.

If the maximum number of iterations has not been exceeded, the ASCE algorithm continues to update the CMYK values for the spot color and the updated CMYK values are written into the printer spot color dictionary. An additional iteration of the ASCE module generates a printable document of patches using the list of spot colors that were just updated and the CMYK values for each spot color as listed in the printer spot color dictionary. As described above, the spot color document is then read through use of an inline sensor or a spectral sensor and the resulting L*a*b* data is sent to the ASCE module. The sequence of checking the measured L*a*b* value against the reference L*a*b* value, assessing whether the quality level was achieved and performing additional iterations is continued until either the color quality criteria has been achieved or the maximum number of iterations has been reached.

At this point, the ASCE module has updated the CMYK recipes for the leader IME, and the algorithm executes steps 810, 820, 830, 840, 850, 860 and 870 as described with reference to steps 710, 720, 730, 740, 750, 760 and 770, respectively, except the leader CMYK values are used in step 810 as initial estimates of the device dependent values associated with the target spot colors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating multidimensional device dependent color recipes for a plurality of printing devices operatively connected to one or more controllers, the one or more controllers configured to perform the method comprising:
   A) generating a final first multidimensional device dependent colorant recipe for a device independent target color for rendering on a first printing device, the final first device dependent recipe iteratively calculated to render the device independent target color on the first printing device using an initial first device dependent recipe and a first GCR process from a plurality of GCR processes, each of the plurality of GCR processes associated with a respective gamut class of the first printing device; and
   B) generating a final second multidimensional device dependent colorant recipe for the device independent target color for rendering on a second printing device, whereby the final second multidimensional device dependent colorant recipe is iteratively calculated to render the device independent target color on the second printing device using the final first multidimensional device dependent colorant recipe associated with the first printing device as an initial estimate of the final second multidimensional device dependent colorant recipe, whereby the use of the final first multidimensional device dependent color recipe associated with the first printing device as the initial estimate forces the use of the first GCR process from the plurality of GCR processes to generate the final second multidimensional device dependent colorant recipe for the device independent target color for rendering on the second printing device, each of the plurality of GCR processes also associated with a respective gamut class of the second printing device,
   wherein the final first and final second multidimensional device dependent colorant recipes associate the device independent target color with respective final first and second multidimensional device dependent color space representations of the target color.

2. The method according to claim 1, comprising:
   generating a final third multidimensional device dependent colorant recipe for the device independent target color for rendering on a third printing device, whereby the final third multidimensional device dependent colorant recipe is iteratively calculated using the final first multidimensional device dependent colorant recipe as an initial estimate of the final third multidimensional device dependent colorant recipe.

3. The method according to claim 1, wherein the device independent target color is representative in a first color space.

4. The method according to claim 1, wherein the final first multidimensional device dependent colorant recipe associates a L*a*b* color space representation of the device independent target color with one of a CMY, CMK, CYK and MYK color space representation.

5. The method according to claim 4, wherein the final second multidimensional device dependent colorant recipe associates the L*a*b* color space representation of the device independent target color with the one of a CMY, CMK, CYK and MYK color space representation associated with the final first multidimensional device dependent colorant recipe.

6. The method according to claim 1, wherein the method generates device dependent six color recipes for a plurality of six color printing devices.

7. A printing system comprising:
   a plurality of printing devices including a first and second printing device; and
   a controller including a computer-usable data carrier storing instructions that, when executed by the controller, cause the controller to perform a method of generating multidimensional device dependent color recipes for the plurality of printing devices comprising:
   A) generating a final first multidimensional device dependent colorant recipe for a device independent target color for rendering on a first printing device, the final first device dependent recipe iteratively calculated to render the device independent target color on the first printing device using an initial first device dependent recipe and a first GCR process from a plurality of GCR processes, each of the plurality of GCR processes associated with a respective gamut class of the first printing device; and
   B) generating a final second multidimensional device dependent colorant recipe for the device independent target color for rendering on the second printing device, whereby the final second multidimensional device dependent colorant recipe is iteratively calculated to render the device independent target color on the second printing device using the final first multidimensional device dependent colorant recipe associated with the first printing device as an initial estimate of the final second multidimensional device dependent colorant recipe, whereby the use of the final first multidimensional device dependent color recipe associated with the first printing device as the initial estimate forces the use of the first GCR process from the plurality of GCR processes to generate the final second multidimensional device dependent colorant recipe for the device independent target color for rendering on the second printing device, each of the plurality of GCR processes also associated with a respective gamut class of the second printing device, wherein the final first and final second multidimensional device dependent colorant recipes associate the device independent target color with respective final first and second multidimensional device dependent color space representations of the target color.

8. The printing system of claim 7, the method comprising: generating a final third multidimensional device dependent colorant recipe for the device independent target color for rendering on a third printing device, whereby the final third multidimensional device dependent colorant recipe is iteratively calculated using the final first multidimensional device dependent colorant recipe as an initial estimate of the final third multidimensional device dependent colorant recipe.

9. The printing system of claim 7, wherein the device independent target color is represented in a first color space.

10. The printing system of claim 7, wherein the final first multidimensional device dependent colorant recipe associates a L*a*b* color space representation of the device independent target color with one of a CMY, CMK, CYK and MYK color space representation.

11. The printing system of claim 7, wherein the final second multidimensional device dependent colorant recipe associates the L*a*b* color space representation of the device independent target color with the one of a CMY, CMK, CYK and MYK color space representation associated with the final first multidimensional device dependent colorant recipe.

12. The printing system of claim 7, wherein the method generates device dependent six color recipes for a plurality of six color printing devices.

13. A printing system comprising:
a controller; and
a first and second printing device operatively connected to the controller,
wherein the controller is configured to
A) generate a final first multidimensional device dependent colorant recipe for a device independent target color for rendering on the first printing device, the final first device dependent recipe iteratively calculated to render the device independent target color on the first printing device using an initial first device dependent recipe and a first GCR process from a plurality of GCR processes, each of the plurality of GCR processes associated with a respective gamut class of the first printing device; and
B) generate a final second multidimensional device dependent colorant recipe for the device independent target color for rendering on a second printing device, whereby the final second multidimensional device dependent colorant recipe is iteratively calculated to render the device independent target color on the second printing device using the final first multidimensional device dependent colorant recipe associated with the first printing device as an initial estimate of the final second multidimensional device dependent colorant recipe, whereby the use of the final first multidimensional device dependent color recipe associated with the first printing device as the initial estimate forces the use of the first GCR process from the plurality of GCR processes to generate the final second multidimensional device dependent colorant recipe for the device independent target color for rendering on the second printing device, each of the plurality of GCR processes also associated with a respective gamut class of the second printing device, wherein the final first and final second multidimensional device dependent colorant recipes associate the device independent target color with respective final first and second multidimensional device dependent color space representations of the target color.

14. The printing system of claim 13, wherein the controller is configured to generate a final third multidimensional device dependent colorant recipe for the device independent target color for rendering on a third printing device, whereby the final third multidimensional device dependent colorant recipe is iteratively calculated using the final first multidimensional device dependent colorant recipe as an initial estimate of the final third multidimensional device dependent colorant recipe.

* * * * *